(12) United States Patent
Chen et al.

(10) Patent No.: US 9,792,568 B2
(45) Date of Patent: Oct. 17, 2017

(54) GENERATING A CAPACITY SCHEDULE FOR A FACILITY

(75) Inventors: Yuan Chen, Sunnyvale, CA (US); Zhenhua Liu, Palo Alto, CA (US); Cullen E. Bash, Los Gatos, CA (US); Daniel Juergen Gmach, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 797 days.

(21) Appl. No.: 14/353,491

(22) PCT Filed: Dec. 23, 2011

(86) PCT No.: PCT/US2011/067125
§ 371 (c)(1),
(2), (4) Date: Apr. 22, 2014

(87) PCT Pub. No.: WO2013/095624
PCT Pub. Date: Jun. 27, 2013

(65) Prior Publication Data
US 2014/0257907 A1    Sep. 11, 2014

(51) Int. Cl.
G06Q 10/00    (2012.01)
G06Q 10/06    (2012.01)
G06Q 10/04    (2012.01)

(52) U.S. Cl.
CPC ....... G06Q 10/06312 (2013.01); G06Q 10/04 (2013.01); G06Q 10/0631 (2013.01)

(58) Field of Classification Search
CPC .......................................... G06Q 10/00–90/00
(Continued)

(56) References Cited

U.S. PATENT DOCUMENTS 5,819,232 A * 10/1998 Shipman ............... G06Q 10/04
  705/22
5,946,662 A *  8/1999 Ettl ................... G06Q 10/06315
  705/22

(Continued)

FOREIGN PATENT DOCUMENTS

| JP | 08186963 A | 7/1996 |
| JP | 2011114900 A | 6/2011 |
| KR | 1020090095452 A | 9/2009 |

OTHER PUBLICATIONS

Arlitt, Martin, et al. "Towards the design and operation of net-zero energy data centers." Thermal and Thermomechanical Phenomena in Electronic Systems (ITherm), 2012 13th IEEE Intersociety Conference on. IEEE, 2012.*

(Continued)

Primary Examiner — Alan S Miller
(74) Attorney, Agent, or Firm — Mannava & Kang, P.C.

(57) ABSTRACT

In a method for generating a capacity schedule for a facility to meet a predefined operational goal, in which the facility is to receive resources from a first resource supply, a prediction of a supply of resources available from the first resource supply for a predetermined period of time is accessed. In addition, a prediction of a demand for resources in the facility during the predetermined period of time is accessed. The prediction of the supply of resources and the prediction of the demand for resources are inputted into a constrained optimization problem and the capacity schedule for the facility is generated by finding a solution to the constrained optimization problem.

19 Claims, 4 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,006,192 | A * | 12/1999 | Cheng | G06Q 10/04 705/20 |
| 6,226,561 | B1 * | 5/2001 | Tamaki | G06Q 10/06 700/100 |
| 6,290,140 | B1 * | 9/2001 | Pesko | F24F 13/24 181/175 |
| 7,062,448 | B2 * | 6/2006 | Trautmann | G06Q 10/06 705/7.12 |
| 7,809,471 | B2 * | 10/2010 | Murakami | F24F 11/006 165/200 |
| 7,962,769 | B1 * | 6/2011 | Patel | G06F 1/206 307/25 |
| 8,155,795 | B2 * | 4/2012 | Ohuchi | H02J 3/14 700/286 |
| 8,457,802 | B1 * | 6/2013 | Steven | G06Q 10/00 700/291 |
| 8,543,248 | B2 * | 9/2013 | Iino | G06Q 10/06 700/291 |
| 2002/0143605 | A1 | 10/2002 | Holland | G06Q 10/06315 705/7.25 |
| 2003/0208392 | A1 * | 11/2003 | Shekar | G06Q 10/06 705/7.22 |
| 2004/0267394 | A1 * | 12/2004 | Kempf | G06Q 10/087 700/99 |
| 2005/0246039 | A1 * | 11/2005 | Iino | G05B 13/042 700/29 |
| 2006/0149608 | A1 * | 7/2006 | Asgari | G06N 99/005 703/2 |
| 2007/0059838 | A1 * | 3/2007 | Morrison | F25J 3/0219 436/55 |
| 2007/0088447 | A1 * | 4/2007 | Stothert | G05B 13/04 700/36 |
| 2009/0309570 | A1 * | 12/2009 | Lehmann | G06F 1/26 323/318 |
| 2010/0057641 | A1 | 3/2010 | Boss et al. | |
| 2010/0087963 | A1 * | 4/2010 | Boston | G06Q 50/06 700/295 |
| 2010/0325453 | A1 | 12/2010 | Dawson et al. | |
| 2011/0046805 | A1 * | 2/2011 | Bedros | H04L 12/2809 700/291 |
| 2012/0005505 | A1 * | 1/2012 | Tolia | G06F 1/206 713/320 |
| 2012/0311111 | A1 * | 12/2012 | Frew | G06F 9/5072 709/221 |
| 2014/0039965 | A1 * | 2/2014 | Steven | G06Q 10/06315 705/7.25 |

OTHER PUBLICATIONS

Liu, Zhenhua, et al. "Renewable and cooling aware workload management for sustainable data centers." ACM SIGMETRICS Performance Evaluation Review. vol. 40. No. 1. ACM, 2012.*
Banerjee, Prithviraj, et al. "Towards a net-zero data center." ACM Journal on Emerging Technologies in Computing Systems (JETC) 8.4 (2012): 27.*
C. E. Bash, et al., Dynamic thermal management of aircooled data centers. In Proc. of ITHERM, 2006.
Chen, Y, et al., Integrated management of application performance, power and cooling in data centers,In Proc. of NOMS 2010, 2010.
Huang, M. W., et al., Tapo: Thermal-aware power optimization techniques for servers and data centers. In Proc. Of IGCC, 2011.
Hussin, M., et al., Efficient Energy Management Using Adaptive Reinforcement Learning-based Scheduling in Large-scale Distributed Systems, Sep. 2011, pp. 385-393, <http://ieeexplore.ieee.org/stamp/stamp.jsp?arnumber=6047206>.
Krioukov, A. et al., Integrating Renewable Energy Using Data Analytics Systems: Challenges and Opportunities, Mar. 2011, pp. 3-11: vol. 34, Issue. 1. <http://www.cs.berkeley.edu/~krioukov/integratingRenewableEnergy.pdf>.
Liu, Z, et al., Greening geographical load balancing. In Proc, ACM Sigmetrics, 2011.
Liu, Z. et al., Geographical load balancing with renewables. In Proc. ACM GreenMetrics, 2011.
PCT: "Notification of Transmittal of the International Search Report and the Written Opinion of the International Searching Authority, or the Declaration"; cited in PCT/US2011/067125: mailed Sep. 25, 2013; 9 pages.
Rao, L., et al., Minimizing electricity cost: Optimization of distributed internet data centers in a multi-electricity-market environment. In Proc. of INFOCOM, 2010.
Wang, Z.., et al., Kratos: Automated management of cooling capacity in data centers with adaptive vent tiles. In Proc, of IMECE 2009.

* cited by examiner

GENERATING A CAPACITY SCHEDULE FOR A FACILITY

BACKGROUND

Various techniques to decrease both the costs and the environmental footprints associated with operating various types of facilities have been and continue to be developed. Some techniques include optimization of energy efficiencies associated with supplying power to the machines and cooling systems in the facilities. Other techniques include metrics for measuring holistic energy efficiency, dynamic thermal management of air-conditioners based on resource demands of the machines, aisle containment, thermally-aware as well as energy-aware virtualized workload placement, and integration of the facility with local (external) ambient conditions through economizers or on-site renewable energy such as wind and solar.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
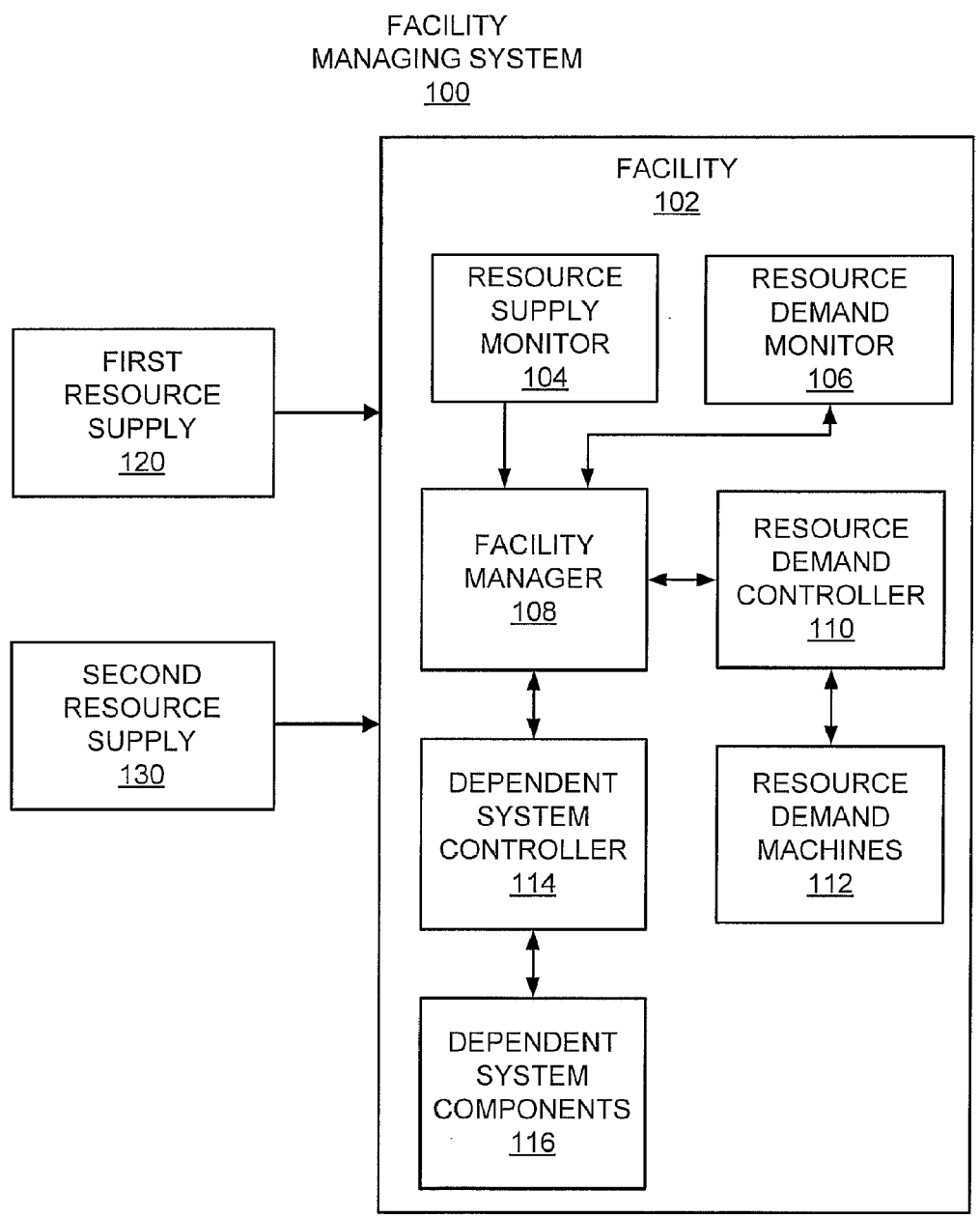
FIG. 1 shows a simplified block diagram of a facility managing system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Disclosed herein are a method and a capacity scheduler for generating a capacity schedule for a facility to meet a predefined operational goal, in which the facility is to receive resources from a first resource supply. The facility may also receive resources from a second resource supply, in which the first resource supply differs from the second resource supply. The first resource supply differs from the second resource supply in that at least one of: the first resource supply comprises a renewable power supply and the second power supply comprises a non-renewable power supply, a resource available from the first resource supply is relatively less expensive than a resource available from the second resource supply, the first resource supply is relatively more sustainable than the second resource supply, etc. In other words, for instance, obtaining resources from the first resource supply may be preferable in terms of at least one of cost, sustainability, etc., as compared with obtaining resources from the second resource supply. In this regard, in certain instances, such as when the price of resources from a non-renewable resource supply is lower than the price of resources from a renewable resource supply, the first resource supply may comprise a non-renewable resource supply and the second resource supply may comprise a renewable resource supply.

In one regard, the method and capacity scheduler disclosed herein generate a capacity schedule that enables resource demand machines in the facility to perform workloads and cooling system components to cool the machines, while substantially meeting a predefined operational goal. More particularly, the machines perform the workloads and the cooling system components cool the machines while substantially meeting the operational goal and while factoring the supply of resources available from the first resource supply. In other words, for instance, a capacity schedule for the facility is generated to enable workloads to be performed in the facility while at least one of minimizing the total cost of ownership of the facility, operating the facility at at least a net-zero energy non-renewable energy consumption, minimizing grid power usage, maximizing usage of renewable resources, etc.

As described in greater detail herein, supply-side constraints, such as, energy availability, cooling availability, water availability, chemical availability, etc., are considered together with workload constraints (or flexibilities) in generating a capacity schedule for the facility. In one regard, the integration of the supply-side constraints and the workload constraints in planning a capacity schedule may result in significant power and/or environmental footprint reductions. According to an example, the method and capacity scheduler disclosed herein enables the facility to be operated as at least a "net-zero energy" facility, which may be designed and operated in a manner that uses renewable resources to entirely offset the use of any non-renewable resources. In other words, a "net-zero energy" facility may be able to pass excess energy back into the grid or to a second resource supply that supplies non-renewable energy and may thus be a negative "net-zero energy" facility. In addition, disclosed herein are manners in which the use of resources supplied by particular resource supplies over resources supplied by other resource supplies along with dynamic workload scheduling and integrated management techniques may be implemented to improve overall facility utilization while allowing workload demand, and in certain instances, cooling demand, to be "shaped" according to resource availability.

In one example, the generated capacity schedule "shifts" demand for resources by non-critical workloads by scheduling the non-critical workload and allocating resources within the facility according to the availability of resources supplied by the first resource supply and the efficiency of cooling the machines that perform the workloads. The shifting of the demand is generally a complex optimization problem due to the dynamism in the supply of resources and demand for resources and their interaction. For instance, on one hand, given the lower electricity price and cooling cost of outside air cooling at night, non-critical workloads, such as, batch jobs, non-interactive workloads, delay-tolerant workloads, etc., should be scheduled to be performed at night. On the other hand, if the renewable resource comprises power available from solar panels, the renewable resource will only be available during the day. As such, when using renewable resources, it may be beneficial to perform the non-critical workloads during the day to reduce recurring power cost and environmental impact.

With reference first to FIG. 1, there is shown a block diagram of a facility managing system 100, according to an example. It should be understood that the facility managing system 100 may include additional components and that one or more of the components described herein may be removed and/or modified without departing from a scope of the facility managing system 100.

The facility managing system 100 includes a facility 102, a first resource supply 120, and a second resource supply 130. Although not shown, the facility management system 100 may include additional resources supplies that share a similar characteristic to one of the first resource supply 120 and the second resource supply 130. In this regard, the resource supplies may form a microgrid of resource supplies to supply resources to the facility 102. According an example, the facility managing system 100 includes a plurality of first resource supplies 120, in which the first resource supplies 120 comprise different types of renewable resource supplies. For instance, one of the first resource supplies 120 may comprise a solar panel and another one of the first resource supplies 120 may comprise a biogas resource supply. In addition, for instance, because the biogas resource supply is likely to be able to provide a more consistent amount of resources, the biogas resource supply may provide a base amount of resources and the resources from the solar panel may be used to provide variable resources to the facility 102 as those resources are available. Moreover, in this example, the second resource supply 130, which may comprise a non-renewable resource supply, may supply resources to the facility 102 as a backup to the first resource supply 120.

The facility 102 is depicted as including a resource supply monitor 104, a resource demand monitor 106, a facility manager 108, a resource demand controller 110, resource demand machines 112, a dependent system controller 114, and dependent system components 116. The facility 102 comprises any suitable type of facility that is to receive resources from both the first resource supply 120 and the second resource supply 130 and is to be cooled by a cooling system. By way of example, the facility 102 comprises a data center, an office or academic building, an industrial manufacturing facility, a chemical processing facility, a clean-room, an automobile manufacturing facility, etc. In this example, the resource demand machines 112 may comprise computers, servers, networking devices, data storage devices, robotic devices, lifting machines, air purifiers, or other apparatuses that consume energy and generate heat while operational. In addition, the dependent system components 116 may comprise components that support the resource demand machines 112.

By way of example, the dependent system components 116 may comprise air-conditioning units, air handlers, blowers, chillers, adaptive vent tiles, or other apparatuses that vary the provisioning of cooling resources supplied into the facility 102 and to the resource demand machines 112. The cooling resources may comprise airflow, chilled water flow, etc., and may be supplied by the dependent system components 116, which consume energy, and/or from the environment, such as cool airflow or water flow, which may also considered as a first (renewable) resource supply 120 in the present disclosure. As other examples, the dependent system components 116 may comprise other types of components that consume resources, such as, air purification devices, heaters, fluid pumps, etc.

The resource demand controller 110 comprises a device and/or sets of machine readable instructions stored in a memory to control the consumption of resources by the resource demand machines 112. For instance, the resource demand controller 110 is to control consumption of resources by the resource demand machines 112 based upon a capacity schedule as planned by the facility manager 108. The dependent system controller 114 comprises a device and/or sets of machine readable instructions stored in a memory to control the provisioning of cooling resources supplied by the dependent system components 116. According to an example, the dependent system controller 114 receives instructions from the facility manager 108 and controls the dependent system components 116 according to the received instructions. In other examples, the dependent system controller 114 operates independently of the facility manager 108.

As discussed above, the first resource supply 120 differs from the second resource supply 130, in that, for instance, it may be preferable to receive resources from the first resource supply as compared with the second resource supply 130. By way of example, the first resource supply 120 may comprise a renewable power supply and the second power supply 130 may comprise a non-renewable power supply. The first resource supply 120 may thus comprise at least one of a photovoltaic energy source, a wind energy source, a biogas energy source, a hydroelectric energy source, a cooling resource supply, etc. The second resource supply 130 may comprise at least one of a utility electrical power grid, a diesel powered energy source, on-site stored energy source, etc. The on-site stored energy source may be electrochemical (for instance, batteries), thermal (for instance, ice), mechanical (for instance, flywheel), etc.

In another example, a resource available from the first resource supply 120 may be relatively less expensive to obtain than a resource available from the second resource supply 130. As a further example, the first resource supply 120 may be relatively more sustainable than the second resource supply 130. In this example, the first resource supply 120 may have a relatively smaller carbon footprint, for instance, as compared with the second resource supply 130.

At various times, the facility 102 may receive resources from the first resource supply 120, the second resource supply 130, or both the first resource supply 120 and the second resource supply 130. Although resources from the first resource supply 120 are in general preferable than resources from the second resource supply 130, the supply of resources from the first resource supply 120 may often be unsteady. For instance, resources available from a renewable resource supply often varies with time, local weather conditions, locations of local power generators, etc. As such, it is often impossible or impractical for facilities to rely solely on resources available from the first resource supply 120. In one regard, therefore, disclosed herein are a method and a facility manager 108 for maximizing the use of resources available from the first resource supply 120 while still meeting performance requirements, which may be outlined in service level agreements. In another regard, the method and facility manager 108 disclosed herein may significantly reduce non-renewable resource consumption and environmental impact of operating a facility 102.

The resource supply monitor 104 comprises any suitable device and/or set of machine readable instructions that tracks the supply of resources from the first resource supply 120 and the second resource supply 130. In one example, the resource supply monitor 104 is positioned in line with the respective supplies of resources from the first resource supply 120 and the second resource supply 130. In another example, the resource supply monitor 104 receives data from the first resource supply 120 and the second resource supply 130 pertaining to the supply of resources from the first resource supply 120 and the second resource supply 130. According to an example, the resource supply monitor 104 also receives prices for the resources available from the second resource supply 130 for various periods of time.

The resource demand monitor 106 comprises any suitable device and/or set of machine-readable instructions stored in a memory that tracks the demands for resources by the resource demand machines 112. In one example, the resource demand monitor 106 directly tracks the resource demands on the resource demand machines 112. In another example, data pertaining to the resource demands of the resource demand machines 112 is supplied to the resource demand monitor 106 from other sources, such as, from historical resource demand traces.

According to a particular example, the facility 102 comprises a data center. In this example, the resource demand machines 112 comprise a plurality of servers to perform various critical and non-critical information technology (IT) workloads. In addition, the dependent system components 116 comprise air delivery apparatuses positioned in the data center to supply airflow to the resource demand machines 112. In one example, the resource demand machines 112 are arranged on electronics racks and the dependent system components 116 supply cooling airflow and/or cooling liquid to the resource demand machines 112.

Figure 2:
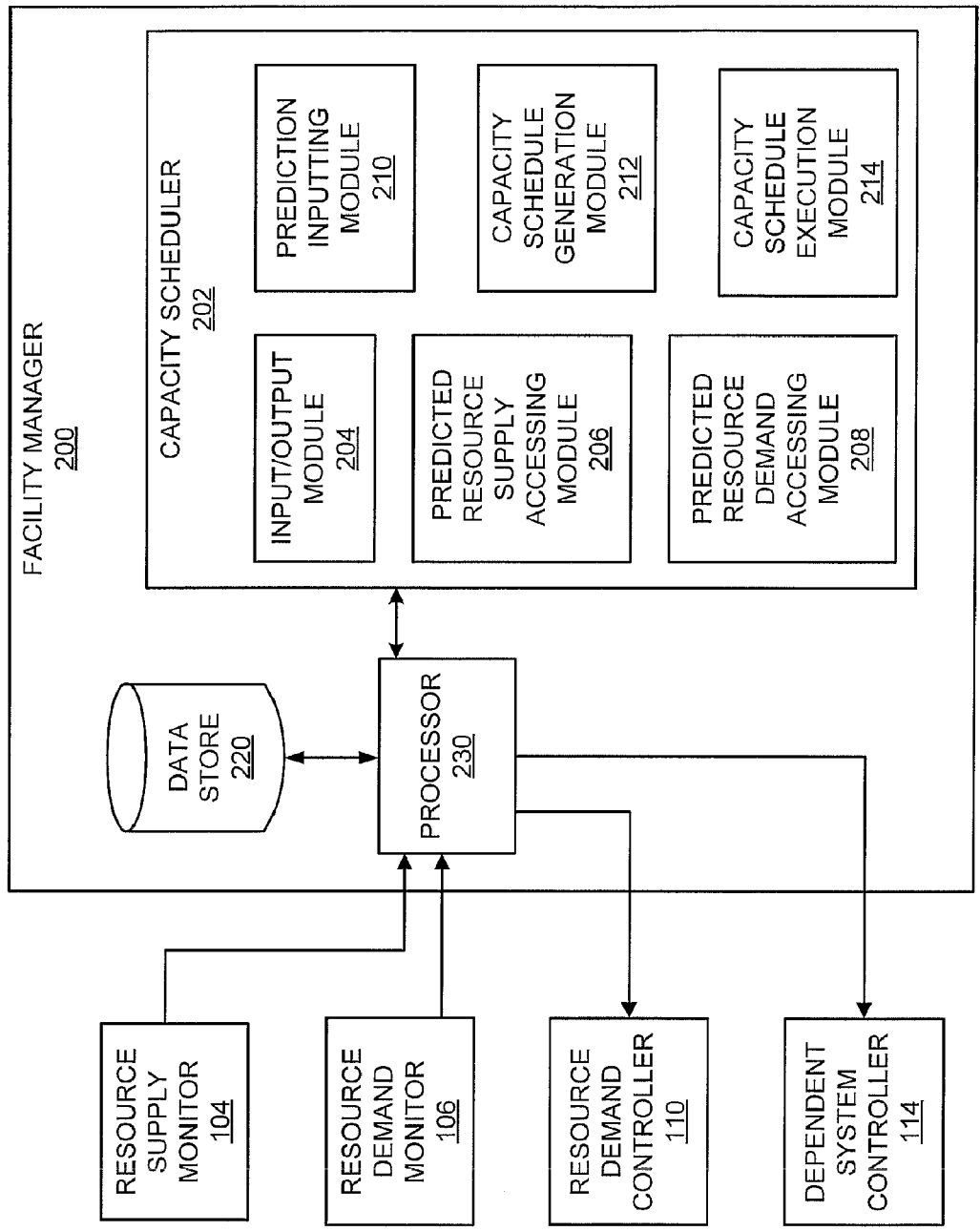
FIG. 2 shows a simplified block diagram of a facility manager, according to an example of the present disclosure.

Turning now to FIG. 2, there is shown a block diagram of a facility manager 200 according to an example. According to an example, the facility manager 200 comprises the facility manager 108 depicted in FIG. 1. In any regard, the facility manager 200 may comprise a server, a computer, a laptop computer, a tablet computer, a personal digital assistant, a cellular telephone, or other electronic apparatus.

The facility manager 200 is depicted as including a capacity scheduler 202, a data store 220, and a processor 230. The capacity scheduler 202 is depicted as including an input/output module 204, a predicted resource supply accessing module 206, a predicted resource demand accessing module 208, a predication inputting module 210, a capacity schedule generation module 212, and a capacity schedule execution module 214. The processor 230, which may comprise a microprocessor, a micro-controller, an application specific integrated circuit (ASIC), and the like, is to perform various processing functions in the facility manager 200. One of the processing functions includes invoking or implementing the modules 204-214 of the capacity scheduler 202 as discussed in greater detail herein below.

According to an example, the capacity scheduler 202 comprises a hardware device, such as, a circuit or multiple circuits arranged on a board. In this example, the modules 204-214 comprise circuit components or individual circuits. According to another example, the capacity scheduler 202 comprises a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 204-214 comprise software modules stored in the capacity scheduler 202. According to a further example, the modules 204-214 comprise a combination of hardware and software modules.

Although not explicitly depicted in FIG. 2, the facility manager 200 may include various interfaces for communicating with the resource supply monitor 104, the resource demand monitor 106, the resource demand controller 110, and the dependent system controller 114. The facility manager 200 may also include various interfaces to enable receipt of instructions and to output various data. The various interfaces may comprise hardware and/or software interfaces. In any regard, the various interfaces may be connected to a network over which the facility manager 200 may receive the various data.

The processor 230 may store data received through the various interfaces in the data store 220 and may use the data in implementing the modules 204-214. The data store 220 comprises volatile and/or non-volatile memory, such as DRAM, EEPROM, MRAM, phase change RAM (PCRAM), Memristor, flash memory, and the like. In addition, or alternatively, the data store 220 comprises a device that is to read from and write to a removable media, such as, a floppy disk, a CD-ROM, a DVD-ROM, or other optical or magnetic media.

Figure 3:
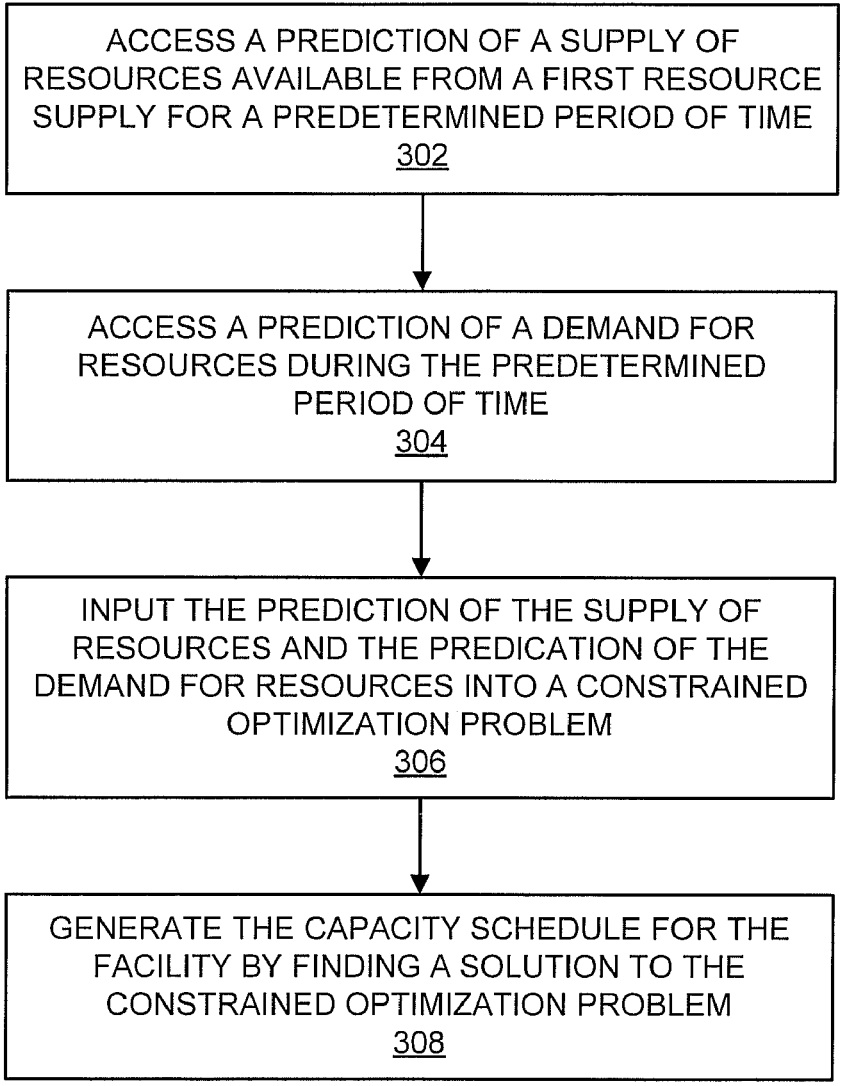
FIG. 3 shows a flow diagram of a method for generating a capacity schedule for a facility, according to an example of the present disclosure.

Various manners in which the modules 204-214 of the capacity scheduler 202 may be implemented are discussed in greater detail with respect to the method 300 depicted in FIG. 3. FIG. 3, more particularly, depicts a flow diagram of a method 300 for generating a capacity schedule in a facility 102 to meet a predefined operational goal, according to an example. It should be apparent to those of ordinary skill in the art that the method 300 represents a generalized illustration and that other steps may be added or existing steps may be removed, modified or rearranged without departing from a scope of the method 300. Although particular reference is made to the capacity scheduler 202 depicted in FIG. 2 as comprising an apparatus and/or a set of machine readable instructions that may perform the operations described in the method 300, it should be understood that differently configured apparatuses and/or machine readable instructions may perform the method 300 without departing from a scope of the method 300.

At block 302, a prediction of a supply of resources available from a first resource supply 120 for a predetermined length of time is accessed, for instance, by the predicted resource supply accessing module 206. The predetermined period of time comprises any suitable period of time in the future that includes, for instance, a few minutes, an hour or more, a day, a week, a month, a year, etc. Thus, for instance, the predicted resource supply accessing module 206 accesses the predicted level of resources, such as, electricity, water, cool air, chemicals, etc., that will likely be available over the predetermined period of time. In one example, the predicted resource supply accessing module 206 receives the predicted resource supply for the predetermined period of time from a separate module (not shown) that is to predict the resource supply available from the first resource supply 120. In another example, the predicted supply accessing module predicts the resource supply available from the first resource supply 120 for the predetermined period of time.

In either of the examples above, historical data, for instance, as collected by the resource supply monitor 104, a description of the first resource supply 120, weather information, etc., may be used to predict the supply of resources available from the first resource supply 120 for the predetermined period of time. The description of the first resource supply 120 may include, for instance, characteristics of components of the first resource supply 120, such as, photovoltaic panels, wind turbines, etc. The weather information may include historical weather data, current weather conditions, forecasts of future weather conditions, such as, temperature, cloudiness, wind speed, solar angle, etc.

According to an example, the prediction of the resources available from the first resource supply 120 for the predetermined period of time is made by using the k-nearest neighbor technique. In this technique, a local search for the most "similar" days in the past is performed and a weighted average of those days is used to make a prediction. The similarity is based on, for instance, the weather conditions during those most "similar" days. By way of particular example, the following equation may be used to predict the output by a photovoltaic array (PV) in hourly time-slots.

$$\hat{y}_t = \frac{\sum_{i \in Nk(x_t, D)} y_i / d(x_i, x_t)}{\sum_{i \in Nk(x_t, D)} 1 / d(x_i, x_t)} \quad \text{Equation (1)}$$

In Equation (1), $\hat{y}_t$ is the predicted output of the PV at hour t; $y_i$ is the actual output of a neighbor i of the PV; x is a feature vector, such as, temperature, humidity, etc.; d is a distance metric function; and $N_k(x,D)$ is the k-nearest neighbors of x in D.

At block 304, a predicted demand for resources in the facility 102 during the predetermined period of time is accessed, for instance, by the predicted resource demand accessing module 208. In one example, the predicted resource demand accessing module 208 receives the predicted resource demand for the predetermined period of time from a separate module that is to predict the resource demand for resources during the predetermined period of time. In another example, the predicted resource accessing module 208 predicts the resource demand for resources from the first resource supply 120 for the predetermined period of time.

In either example, the demand for resources may be predicted through use of historical resource demand information to determine patterns of resource usage and future demands, for instance, as collected by the resource demand monitor 106. Although there is relatively large variability in resource demands, resource demands for interactive workloads often exhibit clear short-term and long-term patterns. Various factors that may be employed to predict the demand for resources include calendar information, such as, weekends, holidays, etc., information on specials events, such as, payroll calculations at the end of the month, or other known periods of high activity, etc.

According to an example, a periodicity analysis of the historical resource demand traces is performed to determine the length of a pattern or a sequence of patterns that appear periodically. More particularly, for instance, a Fast Fourier Transform (FFT) is used to find the periodogram of the time-series data. From this, periods of the most prominent patterns or sequences of patterns are derived. For example, most interactive workloads exhibit prominent daily patterns. An auto-regressive model may then be created to capture both the long term and short term patterns according to the following model. More particularly, the following model estimates w(d,t), the demand at time t on day d, based on the demand of previous N days and previous M time points of the same day.

$$w(d, t) = \sum_{i=1}^{N} a_i * w(d-i, t) + \sum_{j=1}^{M} b_j * w(d, t-j) + c \quad \text{Equation (2)}$$

The parameters in Equation (2) may then be calibrated using the historical data. In Equation (2), a, b and c comprise coefficients.

In another example, the FFT computation is omitted for the resource demand prediction. Instead, the relevant variables in the historical data are identified by feature selection methods, such as regularization. In this example, a large number for prior days, hours and other related variables are considered. For instance, N and M in Equation (2) may be in the order of tens. In addition, an objective function used to minimize the sum of square errors is augmented with a regularization term related to the number/magnitude of the coefficients used in the above regression. One result of this operation is that irrelevant variables drop out as their coefficients go to zero. Examples of such regularization terms are similar to those used in Lasso, ridge-regression, or other similar methods. Using such methods the coefficients may, for example, be determined by solving the following equation:

$$(a_i, b_i) = \underset{\substack{training \\ data}}{\operatorname{argmin}} \sum \left\{ \begin{array}{l} w(d, t) - \sum_{i=1}^{N} a_i * w(d-i, t) - \sum_{j=1}^{M} b_j * \\ w(d, t-j) - c + \lambda(\sum |a_i| + \sum |b_i|) \end{array} \right\} \quad \text{Equation (3)}$$

The prediction of the demand for resources in the facility 102 may also include a prediction for the demand of resources by the dependent system components 116 in cooling the resource demand machines 112. In this example, the demand for resources, such as, energy, cool airflow, water, chemicals, etc., by the dependent system components 116 may be predicted through use of historical demand information to determine patterns of resource usage and future demands, for instance, as collected by the resource demand monitor 106. Thus, for instance, the amount of outside air flow that may be delivered into the facility 102 at the predetermined period of time may be predicted.

At block 306, the prediction of the supply of resources and the prediction of the demand for resources are inputted into a constrained optimization problem, wherein a solution to the constrained optimization problem comprises the capacity schedule, for instance, by the prediction inputting module 210. Generally speaking, the constrained optimization problem is formulated for adapting the capacity schedule, which includes both resource demand capacity allocation and cooling capacity allocation, to the varying supply of resources from the first resource supply 120.

According to an example, the constrained optimization problem is a simplified, piecewise linear resource cost model or cost function, as represented by the following equation:

$$\min_{a,b} \Sigma_t ((p(t)(d(t)-r(t))^+ - \Sigma_t b(t)R). \quad \text{Equation (4)}$$

The cost function of Equation (4) is subject to the following constraints:

$$a(t)+b(t)+f(a(t)+b(t)) \leq d(t), \quad \text{Equation (5)}$$

$$b(t) \geq 0, \quad \text{Equation (6)}$$

$$\Sigma_t b(t)) \leq B, \quad \text{Equation (7)}$$

$$0 \leq a(t) + b(t) \leq D, \quad \text{Equation (8)}$$

$$a(t) + b(t) \leq c(t), \text{ and} \quad \text{Equation (9)}$$

$$\Sigma_t d(t) - \Sigma_t r(t) \leq 0. \quad \text{Equation (10)}$$

In the equations above, a(t) comprises demand for resources by a critical workload predicted for the predetermined period of time (t), b(t) comprises demand for resources by a non-critical workload predicted for the predetermined period of time (t), c(t) comprises cooling capacity of a cooling system for the predetermined period of time (t), d(t) comprise total demand for resources in the facility 102 predicted for the predetermined period of time (t), p(t) comprises a price of resources available from the second resource supply 130 for the predetermined period of time (t), R comprises profit generated by running non-critical workload (per unit), B comprises total demand for resources by non-critical workloads for the predetermined period of time (t), and D comprises total IT capacity for the predetermined period of time (t). The cost function in Equation (4) is defined as the resource cost minus the profit by running non-critical workloads. It should be noted that if the profit from a non-critical workload R is lower than the price of resources p(t) from the second resource supply 130, non-critical workloads will not run on resources obtained from the second resource supply 130 during the predetermined period of time (t).

Equation (5) describes the total demand (d(t)), which is the sum of demand for resources by a critical workload (a(t)), demand for resources by a non-critical workload (b(t)), and cooling demand (f(a(t)+(b(t))). As noted in that equation, cooling demand is a function of demand for resources by both the critical and non-critical workloads, and may be calculated using a model. For example, if the power usage effectiveness of the facility 102 is known, the cooling cost (cooling) may be obtained as follows:

$$\text{cooling} = (a(t) + (b(t)(PUE(t) - 1)). \quad \text{Equation (11)}$$

Equations (7)-(9) respectively describe the capacity constraints for demands for resources by a non-critical workload, demands for resources by a critical workload, and demands for cooling resources. In addition, Equation (10) is a constraint representing the net-zero condition, in which the total demand for resources is less than the resources available from the first resource supply 120.

At block 308, the capacity schedule for the facility 102 is generated by solving the constrained optimization problem, for instance, by the capacity schedule generation module 212. More particularly, for instance, the constrained optimization problem is solved to determine values for the variables in the constrained optimization problem, in which the variables define the capacity schedule for the facility 102. In other words, the solution to the constrained optimization problem defines, for instance, the resources from the first resource supply 120 to be allocated to non-critical workloads. The solution may also define the resources from the first resource supply 120 to be allocated to the critical workloads and the dependent system components 116. The non-critical demand may comprise demands by workloads that need not be performed at particular times or on demand. In this regard, non-critical demands may comprise demands by those workloads that may be performed as system resources are available. By way of particular example, the non-critical workloads comprise batch processing jobs for servers, such as, scientific applications, simulations, financial analysis, image processing, etc. Examples of critical workloads may comprise Internet services, interactive workloads, or other delay-intolerant workloads.

Generally speaking, the capacity schedule generated at block 308 substantially optimizes resource demand scheduling and capacity allocation scheduling to match the predicted resource supply available from the first resource supply 120. For instance, the capacity schedule is generated to substantially match resources available from the first resource supply 120 and the pricing of the resources supplied by the second resource supply 130 and the cooling supply, which may include chiller capacity and outside air cooling availability. In addition, the capacity schedule is generated to meet a predefined operational goal. The predefined operational goal may comprise at least one of that: (1) critical demand for resources is met; (2) at least a net-zero consumption of energy from the second resource supply 130 is achieved; (3) use of resources from the second resource supply 130 is minimized; (4) use of resources from the first resource supply 120 is maximized; and (5) operational costs are minimized.

According to an example, the cost function of Equation (4) is convex in b(t) and c(t) and there exists one optimal solution with a relatively simple structure. In this example, the convex functions and sets are built up from a relatively small set of rules from convex analysis starting from a base library of convex functions and sets. In addition, constraints and objectives that are expressed using these rules are automatically transformed to a canonical form and solved.

The constrained optimization problem may be solved in any of a variety of manners. For instance, an optimization problem solver may be implemented using a set of machine readable instructions for modeling, such as, a Matlab CVX™ tool. By way of example, the optimization problem solver takes as input, the predicted resource supply available from the first resource supply 120 for a predetermined period of time, the predicted supply of cooling resources (such as, air, water, chemicals, etc.) during the predetermined period of time, the predicted demand for resources by critical workloads, the predicted demand for resources by non-critical workloads, and resource demand machine configuration information (such as, number of servers, server power consumption, server power capacity, etc.). Moreover, the optimization problem solver generates a detailed capacity schedule that includes, for instance, when each of the non-critical workloads is to run and the resource allocation for each of the non-critical workloads at each predetermined period of time. In addition, or alternatively, the optimization problem solver generates a breakdown of resource use, such as, resource usage by critical workloads, resource usage by non-critical workloads, and resource usage by cooling systems, as well as, the allocation of resources to be used from the first resource supply 120 and the second resource supply 130.

According to an example, the generated capacity schedule is executed on the resource demand machines 112, and in certain instances, on the dependent system components 116. In this example, the resource demand controller 110 may receive instructions pertaining to how the resources are to be consumed by the resource demand machines 112 during the predetermined period of time. By way of example, the instructions may cause the non-critical workloads to be performed according to the planned capacity schedule. In addition, according to an example, the dependent system controller 114 may also receive instructions pertaining to how the dependent system components 116 are to be operated during the predetermined period of time. In another example, the dependent system controller 114 independently controls operations of the dependent system components 116 based upon operational conditions of the resource demand machines 112.

According to a particular example, the execution of the generated capacity schedule includes the execution of a plurality of applications (workloads) on servers (resource demand machines 112). In this particular example, the functions of the resource demand controller 110 are split among three controllers that are focused on meeting service level agreements (SLAs). The three controllers include an application controller, a local node controller, and a workload management controller. The application controller is to adjust utilization targets for the components of the applications such that the service level objectives are met. In addition, the local node is to control a plurality of servers and to adjust the resource entitlements for each server according to the utilization targets. The local node controller also serves as an arbiter if resources are relatively scarce. The workload management controller maintains the workload allocation in the resource pool and migrates workloads between servers and powers-down or starts additional servers as required.

As discussed above, the workloads may comprise different classes of workloads, for example, critical and non-critical workloads. According to an example, the demand created by the non-critical workloads may be shaped to meet the predefined operational goal. In this example, the workload management controller considers the available supply of resources from the first resource supply 120, for instance, available power, available cooling airflow, etc., and determines how much IT equipment (for instance, how many servers) may be supported according to the generated capacity schedule. The resource demand controller also determines how much equipment is required to support the critical/interactive workloads, and how much additional equipment is required for the non-critical workloads under the constraints of the resource availability. In one regard, a facility operator may define policies such as the demands of critical workloads are always met while the demands of non-critical workloads are only met if sufficient resources, such as power, cooling, etc., are available. The workload management controller may use these policies to migrate the workloads (for instance, consolidating workloads in case the execution plan demands for less resource usage or balancing workloads if the plan allows more resource usage and the workloads would benefit), and power down or start additional IT equipment.

According to an example, a determination as to whether the generated capacity schedule meets the predefined operational goal is made. That is, for instance, the execution of the plan and the actual availability of resources may be continuously monitored and in response to a determination that the generated capacity schedule meets the predetermined operational goal, the capacity schedule may continue to be executed. However, in response to a determination that the generated capacity schedule does not meet the predetermined operational goal, another capacity schedule may be generated.

According to an example, the determination as to whether the generated capacity schedule meets the predefined operational goal includes determining whether the resource availability is substantially consistent with the predicted supply of resources available from the first resource supply 120 and determining whether the monitored resource utilization is substantially consistent with the predicted demand for resources.

According to an example, the predetermined period of time is static, for instance, every day for the execution of the next day. According to another example, the predetermined period of time is dynamic, for instance, a new plan is created if the current plan differs beyond a predetermined tolerance level from the actual supply of resources and demand for resources, if the current plan cannot be executed as planned, or if the planning period has ended. In addition, the method 300 may be repeated for the same time period or for different time periods.

At instances before, during, and after performance of the method 300, various data may be outputted, for instance, by the input/output module 204. Thus, for instance, the input/output module 204 may output an indication as to whether the generated capacity schedule meets the predefined operational goal.

Some or all of the operations set forth in the method 300 may be contained as a utility, program, or subprogram, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 4:
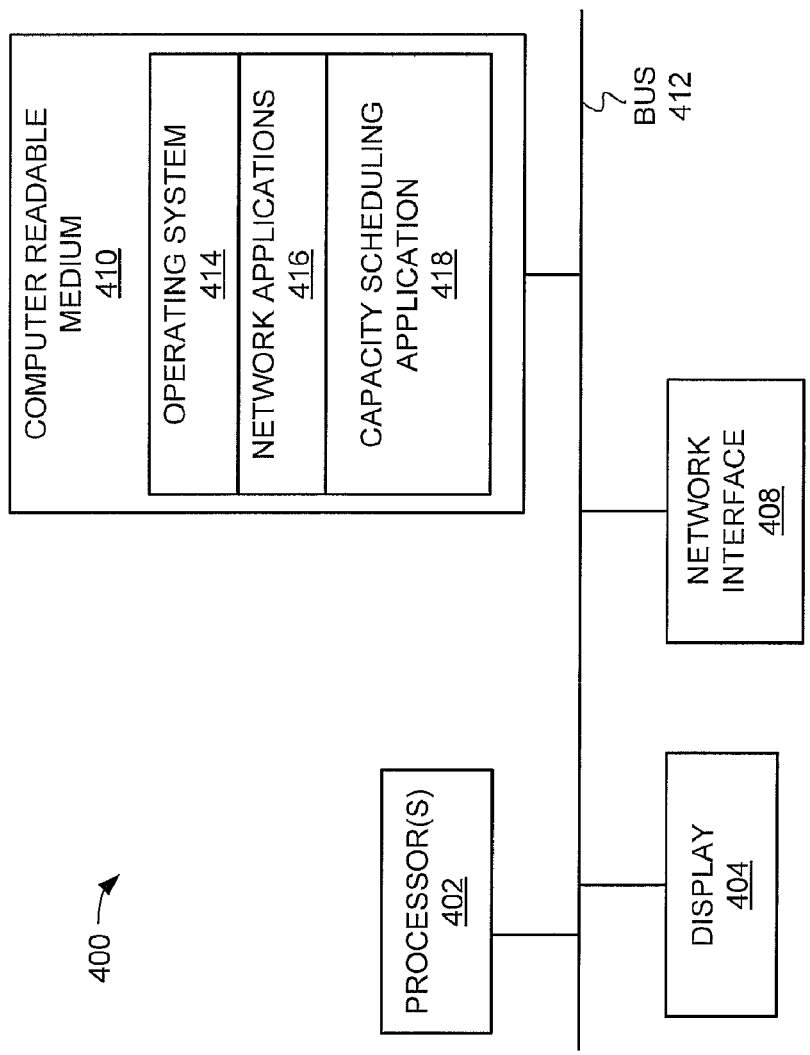
FIG. 4 illustrates a schematic representation of a computing device, which may be employed to perform various functions of the capacity scheduler depicted in FIG. 2, according to an example of the present disclosure.

Turning now to FIG. 4, there is shown a schematic representation of a computing device 400, which may be employed to perform various functions of the capacity scheduler 202 depicted in FIG. 2, according to an example. The computing device 400 includes one or more processors 402, such as but not limited to a central processing unit; one or more display devices 404, such as but not limited to a monitor; one or more network interfaces 408, such as but not limited to a Local Area Network LAN, a wireless 802.11x LAN, a 3G mobile WAN or a WiMax WAN; and one or more computer-readable mediums 410. Each of these components is operatively coupled to one or more buses 412. For example, the bus 412 may be an EISA, a PCI, a USB, a FireWire, a NuBus, or a PDS.

The computer readable medium 410 may be any suitable medium that participates in providing instructions to the processor 402 for execution. For example, the computer readable medium 410 may be non-volatile media, such as memory. The computer-readable medium 410 may also store an operating system 414, such as but not limited to Mac OS, MS Windows, Unix, or Linux; network applications 416; and a capacity scheduling application 418. The operating system 414 may be multi-user, multiprocessing, multitasking, multithreading, real-time and the like. The operating system 414 may also perform basic tasks such as but not limited to recognizing input from input devices, such as but not limited to a keyboard or a keypad; sending output to the display 404; keeping track of files and directories on medium 410; controlling peripheral devices, such as but not limited to disk drives, printers, image capture device; and managing traffic on the one or more buses 412. The network applications 416 include various components for establishing and maintaining network connections, such as but not limited to machine readable instructions for implementing communication protocols including TCP/IP, HTTP, Ethernet, USB, and FireWire.

The capacity scheduling application 418 provides various components for generating a capacity schedule as discussed above with respect to the method 300 in FIG. 3. The capacity scheduling application 418 may thus comprise the input/output module 204, the predicted resource supply accessing module 206, the predicted resource demand accessing module 208, the prediction inputting module 210, the capacity schedule generation module 212, and the capacity schedule execution module 214. In this regard, the capacity scheduling application 418 may include modules for accessing a prediction of a supply of resources available from a first resource supply for a predetermined period of time, accessing a prediction of a demand for resources in the facility during the predetermined period of time, inputting the prediction of the supply of resources and the prediction of the demand for resources into a constrained optimization problem, and generating the capacity schedule for the facility by solving the constrained optimization problem.

In certain examples, some or all of the processes performed by the application 418 may be integrated into the operating system 414. In certain examples, the processes can be at least partially implemented in digital electronic circuitry, or in computer hardware, machine readable instructions (including firmware and software), or in any combination thereof, as also discussed above.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for generating a capacity schedule for a facility to meet a predefined operational goal, wherein the facility is to receive resources from a first resource supply, said method comprising:
   a) accessing a prediction of a supply of resources available from the first resource supply for a predetermined period of time;
   b) accessing a prediction of a demand for resources in the facility during the predetermined period of time;
   c) inputting the prediction of the supply of resources and the prediction of the demand for resources into a constrained optimization problem, wherein a solution to the constrained optimization problem comprises the capacity schedule;
   d) generating the capacity schedule for the facility by finding a solution, by a processor, to the constrained optimization problem, including determining a total number of resource demand machines in the facility to be supported by the first resource supply according to the capacity schedule; and
   e) powering down or starting up, by the processor, additional resource demand machines in the facility to meet the total number of resource demand machines according to the capacity schedule.

2. The method according to claim 1, further comprising: accessing a predicted supply of external cooling resources available during the predetermined period of time; and wherein (c) further comprises inputting the predicted supply of external cooling resources into the constrained optimization problem.

3. The method according to claim 1, further comprising: receiving a price of resources available from the first resource supply during the predetermined period of time; and wherein (c) further comprises inputting the received price of resources into the constrained optimization problem.

4. The method according to claim 1, wherein (b) further comprises accessing the predicted demand for resources by both the resource demand machines to perform workloads and cooling system components to cool the resource demand machines in the facility during the predetermined period of time.

5. The method according to claim 4, wherein (c) further comprises inputting the predicted demand for resources by both the resource demand machines to perform the workloads and the cooling systems to cool the resource demand machines into the constrained optimization problem.

6. The method according to claim 4, wherein the workloads comprise critical workloads and non-critical workloads, and wherein (d) further comprises generating the capacity schedule for the facility that substantially optimizes a scheduling of the non-critical workloads during the predetermined period of time while meeting the predefined operational goal.

7. The method according to claim 1, wherein the optimization problem is formulated as the following constrained optimization problem:

$$\min_{a,b} \Sigma_t ((p(t)(d(t)-r(t))^+ - \Sigma_t b(t) R),$$

$$\text{s.t. } a(t)+b(t)+f(a(t)+b(t)) \leq d(t),$$

$$b(t) \geq 0,$$

$$\Sigma_t b(t)) \leq B,$$

$$0 \leq a(t)+b(t) \leq D,$$

$$a(t)+b(t) \leq c(t), \text{ and}$$

$$\Sigma_t d(t) - \Sigma_t r(t) \leq 0,$$

wherein a(t) comprises demand for resources by a critical workload, b(t) comprises demand for resources by a non-critical workload, c(t) comprises cooling capacity of a cooling system, d(t) comprises total demand for resources in the facility, p(t) comprises a price of resources available from the second resource supply, R comprises profit generated by running non-critical workload (per unit), B comprises total demand for resources by non-critical workloads; and D comprises total information technology capacity.

8. The method according to claim 1, wherein generating the capacity schedule further comprises solving the constrained optimization problem using convex functions.

9. The method according to claim 1, wherein the facility is to also receive resources from a second resource supply, and wherein the first resource supply differs from the second resource supply in that at least one of:
   the first resource supply comprises a renewable power supply and the second power supply comprises a non-renewable power supply;
   a resource available from the first resource supply is relatively less expensive than a resource available from the second resource supply; and
   the first resource supply is relatively more sustainable than the second resource supply.

10. A capacity scheduler to generate a capacity schedule for a facility to meet a predefined operational goal, wherein the facility is to receive resources from a first resource supply, said capacity scheduler comprising:
  a processor; and
  a memory storing machine readable instructions that when executed by the processor cause the processor to:
    access a prediction of a supply of resources available from the first resource supply for a predetermined period of time;
    access a prediction of a demand for resources in the facility during the predetermined period of time;
    input the prediction of the supply of resources and the prediction of the demand for resources into a constrained optimization problem, wherein a solution to the constrained optimization problem comprises the capacity schedule;
    generate the capacity schedule for the facility by finding solution to the constrained optimization problem, including determining a total number of resource demand machines in the facility to be supported by the first resource supply according to the capacity schedule; and
    power down or start up additional resource demand machines in the facility to meet the total number of resource demand machines according to the capacity schedule.

11. The capacity scheduler according to claim 10, wherein the machine-readable instructions are to cause the processor to:
  access a predicted supply of external cooling resources available during the predetermined period of time; and
  input the predicted supply of external cooling resources into the constrained optimization problem.

12. The capacity scheduler according to claim 10, wherein the machine-readable instructions are to cause the processor to:
  access the predicted demand for resources by both the resource demand machines to perform workloads and cooling system components to cool the resource demand machines in the facility during the predetermined period of time;
  input the predicted demand for resources by both the resource demand machines to perform the workloads and the cooling systems to cool the resource demand machines into the constrained optimization problem; and
  generate the capacity schedule for the facility that substantially optimizes a scheduling of resource demand consumption by non-critical workloads during the predetermined period of time while meeting the predefined operational goal.

13. The capacity scheduler according to claim 10, wherein the optimization problem is formulated as the following constrained optimization problem:

$\min_{a,b}\Sigma_t((p(t)(d(t)-r(t))^+ - \Sigma_t b(t)R)$, s.t. $a(t)+b(t)+f(a(t)+b(t)) \leq d(t)$, $b(t) \geq 0$, $\Sigma_t b(t) \leq B$, $0 \leq a(t)+b(t) \leq D$, $a(t)+b(t) \leq c(t)$, and $\Sigma_t d(t) - \Sigma_t r(t) \leq 0$, wherein a(t) comprises demand for resources by a critical workload, b(t) comprises demand for resources by a non-critical workload, c(t) comprises cooling capacity of a cooling system, d(t) comprises total demand for resources in the facility, p(t) comprises a price of resources available from the first resource supply, R comprises profit generated by running non-critical workload (per unit), B comprises total demand for resources by non-critical workloads; and D comprises total workload capacity.

14. The capacity scheduler according to claim 10, wherein the facility is to also receive resources from a second resource supply, and wherein the first resource supply differs from the second resource supply in that at least one of:
  the first resource supply comprises a renewable power supply and the second power supply comprises a non-renewable power supply;
  a resource available from the first resource supply is relatively less expensive than a resource available from the second resource supply; and
  the first resource supply is relatively more sustainable than the second resource supply.

15. A non-transitory computer readable storage medium on which is embedded at least one computer program, said at least one computer program implementing a method for generating a capacity schedule for a facility to meet a predefined operational goal, wherein the facility is to receive resources from a first resource supply, said at least one computer program comprising computer readable code that when executed by a processor cause the processor to:
  access a prediction of a supply of resources available from the first resource supply for a predetermined period of time;
  access a prediction of a demand for resources in the facility during the predetermined period of time;
  input the prediction of the supply of resources and the prediction of the demand for resources into a constrained optimization problem;
  generate the capacity schedule for the facility by finding a solution to the constrained optimization problem, including determining a total number of resource demand machines in the facility to be supported by the first resource supply according to the capacity schedule; and
  power down or start up additional resource demand machines in the facility to meet the total number of resource demand machines according to the capacity schedule.

16. The non-transitory computer readable storage medium according to claim 15, wherein the computer readable code is to cause the processor to:
  access a predicted supply of external cooling resources available during the predetermined period of time; and
  input the predicted supply of external cooling resources into the constrained optimization problem.

17. The non-transitory computer readable storage medium according to claim 15, wherein the computer readable code is to cause the processor to:
  access the predicted demand for resources by both the resource demand machines to perform workloads and cooling system components to cool the resource demand machines in the facility during the predetermined period of time;
  input the predicted demand for resources by both the resource demand machines to perform the workloads and the cooling systems to cool the resource demand machines into the constrained optimization problem; and generate the capacity schedule for the facility that substantially optimizes a scheduling of resource demand consumption by non-critical workloads during the predetermined period of time while meeting the predefined operational goal.

18. The non-transitory computer readable storage medium according to claim 15, wherein the optimization problem is formulated as the following constrained optimization problem:

$\min_{a,b} \Sigma_t ((p(t)(d(t)-r(t))^+ - \Sigma_t b(t)R)$, s.t. $a(t)+b(t)+f(a(t)+b(t)) \leq d(t)$, $b(t)) \geq 0$, $\Sigma_t b(t)) \leq B$, $0 \leq a(t)+b(t) \leq D$, $a(t)+b(t) \leq c(t)$, and $\Sigma_t d(t) - \Sigma_t r(t) \leq 0$, wherein a(t) comprises demand for resources by a critical workload, b(t) comprises demand for resources by a non-critical workload, c(t) comprises cooling capacity of a cooling system, d(t) comprises total demand for resources in the facility, p(t) comprises a price of resources available from the first resource supply, R comprises profit generated by running non-critical workload (per unit), B comprises total demand for resources by non-critical workloads; and D comprises total workload capacity.

19. The non-transitory computer readable storage medium according to claim 15, wherein the facility is to receive resources from a second resource supply, and wherein the first resource supply differs from the second resource supply in that at least one of:

the first resource supply comprises a renewable power supply and the second power supply comprises a non-renewable power supply;

a resource available from the first resource supply is relatively less expensive than a resource available from the second resource supply; and the first resource supply is relatively more sustainable than the second resource supply.

* * * * *